United States Patent

Schulz-Dobrick et al.

(10) Patent No.: US 9,171,652 B2
(45) Date of Patent: *Oct. 27, 2015

(54) PROCESS FOR PREPARING PRECURSORS FOR TRANSITION METAL MIXED OXIDES

(75) Inventors: Martin Schulz-Dobrick, Mannheim (DE); Simon Schroedle, Donauwoerth (DE)

(73) Assignee: BASF SE, Ludwigshafen (DE)

( * ) Notice: Subject to any disclaimer, the term of this patent is extended or adjusted under 35 U.S.C. 154(b) by 916 days.

This patent is subject to a terminal disclaimer.

(21) Appl. No.: 13/302,007

(22) Filed: Nov. 22, 2011

(65) Prior Publication Data

US 2012/0132860 A1    May 31, 2012

Related U.S. Application Data

(60) Provisional application No. 61/417,243, filed on Nov. 25, 2010.

(51) Int. Cl.
  *H01M 4/13* (2010.01)
  *H01B 1/04* (2006.01)
  *H01M 4/505* (2010.01)
  *H01M 4/525* (2010.01)
  *H01M 4/131* (2010.01)
  *H01M 4/1391* (2010.01)
  *H01M 10/052* (2010.01)

(52) U.S. Cl.
  CPC ............... *H01B 1/04* (2013.01); *H01M 4/505* (2013.01); *H01M 4/525* (2013.01); *H01M 4/131* (2013.01); *H01M 4/1391* (2013.01); *H01M 10/052* (2013.01); *Y02E 60/122* (2013.01)

(58) Field of Classification Search
  USPC .............. 429/231.1, 220, 221, 223, 224, 229
  See application file for complete search history.

(56) References Cited

U.S. PATENT DOCUMENTS

| | | |
|---|---|---|
| 7,879,266 B2 | 2/2011 | Nakaoka |
| 7,897,069 B2 | 3/2011 | Nakaoka |
| 8,066,915 B2 | 11/2011 | Nakaoka |
| 2003/0129495 A1 | 7/2003 | Yamato et al. |
| 2006/0121350 A1 | 6/2006 | Kajiya et al. |
| 2008/0193841 A1* | 8/2008 | Sun et al. .................. 429/220 |
| 2009/0194746 A1 | 8/2009 | Nakaoka |
| 2009/0197173 A1 | 8/2009 | Nakaoka |
| 2009/0226811 A1 | 9/2009 | Nakaoka |
| 2011/0114900 A1 | 5/2011 | Nakaoka |

FOREIGN PATENT DOCUMENTS

| | | |
|---|---|---|
| CN | 1396672 A | 2/2003 |
| EP | 1 351 327 A1 | 10/2003 |
| WO | WO 2006/023092 A2 | 3/2006 |

OTHER PUBLICATIONS

U.S. Appl. No. 13/302,370, filed Nov. 22, 2011, Martin Schulz-Dobrick, et al.
U.S. Appl. No. 13/167,079, filed Jun. 23, 2011, Simon Schroedle, et al.
U.S. Appl. No. 13/236,858, filed Sep. 20, 2011, Martin Schulz-Dobrick, et al.
U.S. Appl. No. 13/236,699, filed Sep. 20, 2011, Martin Schulz-Dobrick, et al.
Search Report issued Feb. 24, 2012 in European Patent Application No. 11190507.1-1218 (with English Translation of Category of Cited Documents).
U.S. Appl. No. 13/764,936, filed Feb. 12, 2013, Volkov, et al.
International Search Report issued Mar. 29, 2012, in PCT/IB2011/055281.

* cited by examiner

*Primary Examiner* — Monique Peets
(74) *Attorney, Agent, or Firm* — Oblon, McClelland, Maier & Neustadt, L.L.P.

(57) ABSTRACT

A process for preparing transition metal mixed oxide precursors, including:
  (A) precipitating, from aqueous solution at a pH of 8.0 to 9.0, a compound of formula (I):

$$M(CO_3)_b O_c (OH)_d A_m B_e (SO_4)_f X_g (PO_4)_h \quad (I),$$

wherein:
M is one or more transition metals,
A is sodium or potassium,
B is one or more metals of groups 1 to 3, excluding Na and potassium,
X is halide, nitrate or carboxylate,
b is 0.75 to 0.98,
c is zero to 0.50,
d is zero to 0.50,
where the sum (c+d) is 0.02 to 0.50,
e is zero to 0.1,
f is zero to 0.05,
g is zero to 0.05,
h is zero to 0.10,
m is 0.002 to 0.1,
and
(B) separating the precipitated material from the mother liquor,
where the particles of material of formula (I) have a spherical shape.

21 Claims, No Drawings

PROCESS FOR PREPARING PRECURSORS FOR TRANSITION METAL MIXED OXIDES

The present invention relates to a process for preparing precursors for transition metal mixed oxides, wherein (A) a material having the formula (I)

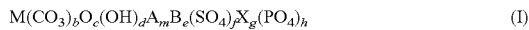

$$M(CO_3)_b O_c(OH)_d A_m B_e(SO_4)_f X_g(PO_4)_h \quad (I)$$

where the variables are defined as follows:
M is one or more transition metals,
A is sodium or potassium,
B is one or more metals of groups 1 to 3 of the Periodic Table, excluding Na and potassium,
X is halide, nitrate or carboxylate,
b is in the range from 0.75 to 0.98,
c is in the range from zero to 0.50,
d is in the range from zero to 0.50,
    where the sum (c+d) is in the range from 0.02 to 0.50,
e is in the range from zero to 0.1,
f is in the range from zero to 0.05,
g is in the range from zero to 0.05,
h is in the range from zero to 0.10,
m is in the range from 0.002 to 0.1,
is precipitated from aqueous solution at a pH in the range from 8.0 to 9.0 and
(B) the precipitated material is separated off from the mother liquor,
where the particles of material of the general formula (I) have a spherical shape.

The present invention further relates to materials of the general formula (I) and also their use.

The storage of energy has for a long time been a subject of increasing interest. Electrochemical cells, for example batteries or accumulators, can be employed for storing electric energy. Lithium ion batteries have recently attracted considerable interest. They are superior in some technical aspects to conventional batteries. Thus, they can generate voltages which cannot be obtained using batteries based on aqueous electrolytes.

Here, the materials of which the electrodes are made and in particular the material of which the cathode is made play an important role.

In many cases, lithium-comprising transition metal mixed oxides, in particular lithium-comprising nickel-cobalt-manganese oxides, which may be doped with one or more transition metals are used. Such lithium-comprising transition metal mixed oxides are usually made in a two-stage process in which a sparingly soluble compound or a mixture of a plurality of sparingly soluble compounds is firstly precipitated from one or more solutions of transition metal salts; this sparingly soluble compound or mixture is also referred to as precursor. This precursor is treated thermally, usually in the range from 600 to 1000° C., in a second stage.

However, a problem associated with many batteries is the cycling stability, the high-power stability and the energy density, which in each case are in need of improvement.

Our observations have been able to show that the performance of the electrode material depends on various factors related to the composition of the transition metal mixed oxide and its morphology. The production process influences the properties of the electrode material, as does in many cases the process for preparing precursors.

US 2009/0194746 discloses a process in which nickel-, manganese- and cobalt-comprising precursors are obtained by precipitation of mixed carbonates having a particular tap density, BET surface area and particle size. The process is based on mixing at least three different solutions with one another: a solution of transition metal salts, for example the chlorides, a solution of metal carbonates, in particular alkali metal carbonates, and a solution of metal salts of the anion of the transition metal salts, i.e., for example, alkali metal chloride. This gives oxide- and hydroxide-free spherical carbonates of nickel, manganese and cobalt. However, a disadvantage is that the alkali metal salt which is additionally used, for example the alkali metal chloride, is obtained as waste and has to be worked up or disposed of.

US 2009/0197173 discloses a process for making oxide- and hydroxide-free carbonates of nickel, manganese and cobalt which have a high BET surface area. Solutions of firstly nickel chloride, cobalt chloride and manganese chloride and secondly sodium hydrogencarbonate are mixed. However, a disadvantage is the moderate solubility of sodium hydrogencarbonate, so that large volumes of sodium hydrogencarbonate solution have to be processed.

US 2006/0121350 discloses a process by means of which particles which are a mixture of a plurality of carbonates of nickel, manganese and cobalt and a further carbonate of the formula $DCO_3$ and a hydroxide of the formula $D(OH)$ can be produced. Here, solutions of transition metal salts and of salts of D are admixed with $Li_2CO_3$. A disadvantage of this process is that lithium carbonate is comparatively expensive and can be recovered only by work-up of the mother liquor.

It was therefore an object of the invention to provide a process by means of which improved precursors for transition metal mixed oxides and electrode materials can be prepared. A further object was to provide improved electrodes and improved electrochemical cells.

We have accordingly found the process defined at the outset, which for the purposes of the present invention is also referred to as process of the invention for short.

The process of the invention comprises at least two steps, referred to as steps (A) and (B) for short.

To carry out step (A), a material having the formula (I),

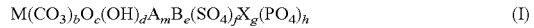

$$M(CO_3)_b O_c(OH)_d A_m B_e(SO_4)_f X_g(PO_4)_h \quad (I)$$

where the variables are defined as follows:
M is one or more transition metals, for example Ni, Mn, Co, Fe, Cu, Zn, Ti, Cr, preferably from two to four transition metals, particularly preferably three transition metals, in particular combinations of nickel, manganese and cobalt,
A is potassium or preferably sodium,
B is one or more metals of groups 1 to 3 of the Periodic Table, with the exception of sodium and potassium, with preference being given to cesium, rubidium and particularly preferably lithium, magnesium, calcium and aluminum and also mixtures of two or more of the abovementioned elements,
X is halide, for example bromide, preferably chloride, particularly preferably fluoride, also nitrate or carboxylate, preferably $C_1$-$C_7$-carboxylate, in particular benzoate or acetate,
b is in the range from 0.75 to 0.98,
c is in the range from zero to 0.50, preferably up to 0.30,
d is in the range from zero to 0.50, preferably up to 0.30,
    where the sum (c+d) is in the range from 0.02 to 0.50, preferably up to 0.30,
e is in the range from zero to 0.1, preferably up to 0.05,
f is in the range from zero to 0.05,
g is in the range from zero to 0.05,
h is in the range from zero to 0.1, preferably up to 0.05,
m is in the range from 0.002 to 0.1, preferably up to 0.05,
is precipitated from an aqueous solution having a pH in the range from 8.0 to 9.0, where the particles of material of the general formula (I) have a spherical shape.

In an embodiment of the present invention, M is chosen from at least two transition metals selected from among Ni, Mn, Co, Fe, Cu, Zn, Ti and Cr.

In an embodiment of the present invention, M is chosen from Ni, Co and Mn.

In an embodiment of the present invention, from 55 to 85 mol % of M is chosen as Mn, i.e. M is chosen so that from 55 to 85 mol % of M is manganese, and the balance is selected from one or more other transition metals, preferably from among Ni, Co, Fe, Cu, Zn, Ti and/or Cr and particularly preferably as a combination of Ni and Co.

Material of the general formula (I) can be water-comprising. For the purposes of the present invention, "water-comprising" means that the material can have a content of chemically or physically bound water in the range from 1 to 50% by weight, preferably from 2 to 20% by weight. Here, water can either be bound in the crystal lattice of the material of the general formula (I) or be physically bound to the particles. In particular, water can still be present even after drying of the material, for example at up to 105° C. Examples of chemically bound water are hydrate complexes and thermally labile hydroxides which can eliminate water at, for example, temperatures in the range from 50 to 300° C. in air. However, any water present is, for the purposes of the present invention, not taken into account in the formula.

To carry out the process of the invention, an aqueous solution comprising a water-soluble salt of transition metal M or water-soluble salts of transition metal(s) M and optionally A and B is used as starting material. For the purposes of the present invention, such a solution will also be referred to as "aqueous solution of transition metal salt(s)". Water-soluble salts of M, in particular of nickel, cobalt and manganese, are, for example, carboxylic acid salts, in particular acetates, of transition metal M, also sulfates, nitrates, halides, in particular bromides or chlorides, of transition metal M, where M is preferably present in the oxidation state +2. Such a solution preferably has a pH in the range from 2 to 7, particularly preferably in the range from 3 to 6.

If a material of the general formula (I) which has a plurality of transition metals M is to be precipitated, it is possible to start out from an aqueous solution having two or more counterions as anions, for example by using an aqueous solution of cobalt chloride, nickel chloride and manganese acetate. In another variant, salts of a plurality of transition metals which each have the same counterions are used.

In an embodiment of the present invention, it is possible to start out from an aqueous solution of transition metal salt(s) which comprises water together with one or more organic solvents, for example ethanol, methanol or isopropanol, for example up to 15% by volume, based on water. In another embodiment of the present invention, an aqueous solution of transition metal salt(s) which comprises less than 0.1% by weight, based on water, of organic solvent or preferably no organic solvent is used as starting material.

In an embodiment of the present invention, the aqueous solution of transition metal salt(s) which is used comprises ammonia, ammonium salt or one or more organic amines, for example methylamine or ethylenediamine. Ammonia or organic amines can be added separately or they can be formed by dissociation of complex salts of transition metal salt in aqueous solution. The aqueous solution of transition metal salt(s) preferably comprises less than 10 mol % of ammonia or organic amine, based on transition metal M. In a particularly preferred embodiment of the present invention, the aqueous solution of transition metal salt(s) comprises measurable proportions of neither ammonia nor organic amine.

Preferred ammonium salts can be, for example, ammonium sulfate and ammonium sulfite.

The aqueous solution of transition metal salt(s) can have a total concentration of M in the range from 0.01 to 5 mol/kg of solution, with preference being given to from 1 to 3 mol/kg of solution.

In an embodiment of the present invention, the molar ratio of transition metals in the aqueous solution of transition metal salt(s) is matched to the desired stoichiometry in the cathode material or the transition metal mixed oxide. It may here need to be taken into account that the solubilities of various transition metal carbonates can be different.

The aqueous solution of transition metal salt(s) can comprise one or more further salts in addition to the counterions of the transition metal salt or salts of M. These are preferably salts which do not form sparingly soluble salts with M or are hydrogencarbonates of, for example, sodium, potassium, magnesium or calcium which can give rise to precipitation of carbonates when the pH is changed.

In another embodiment of the present invention, the aqueous solution of transition metal salt(s) comprises only small proportions of further chlorides, acetates, nitrates or sulfates, for example less than 5 mol %, based on M.

In another embodiment of the present invention, the aqueous solution of transition metal salt(s) does not comprise any further chlorides, acetates, nitrates or sulfates.

In an embodiment of the present invention, the variables f, g and h in formula (I) are determined by which transition metal salts are used in the aqueous solution of transition metal(s). Thus, for example, when only the sulfates of manganese, cobalt, nickel and optionally one or more further transition metals M have been used for preparing the aqueous solution of transition metal(s), it is possible for f to be greater than zero and up to 0.05, while g and h are zero.

In an embodiment of the present invention, the aqueous solution of transition metal salt(s) can comprise one or more additives which can be selected from among biocides, complexing agents such as ammonia, chelating agents, reducing agents, carboxylic acids and buffers. In another embodiment of the present invention, the aqueous solution of transition metal salt(s) does not comprise any additives.

Examples of suitable reducing agents which can be present in the aqueous solution of transition metal salt(s) are sulfites, in particular sodium sulfite, sodium hydrogensulfite, potassium sulfite, potassium bisulfite, ammonium sulfite, also hydrazine and salts of hydrazine, for example the hydrogensulfate, also water-soluble organic reducing agents such as ascorbic acid or aldehydes.

The precipitation in step (A) can preferably be brought about by combining the aqueous solution of transition metal salt(s) in one or more steps with an aqueous solution of one or more alkali metal carbonates, for example by addition of a solution of alkali metal carbonate to the aqueous solution of transition metal salt(s). Particularly preferred alkali metal carbonates are sodium carbonate and potassium carbonate.

In an embodiment of the present invention, the precipitation is brought about by addition of an aqueous solution of sodium carbonate or potassium carbonate to an aqueous solution of acetates, sulfates or nitrates of transition metal(s) M.

The aqueous solution of alkali metal carbonate can have a concentration of carbonate in the range from 0.1 to 3 mol/kg, preferably from 1 to 2.5 mol/kg.

The aqueous solution of alkali metal carbonate can comprise one or more further salts, for example ammonium salts, in particular ammonium carbonate, ammonium hydroxide, ammonium hydrogencarbonate, ammonium sulfate or ammonium sulfite. In one embodiment, a molar ratio of $NH_3:M$ of from 0.01 to 0.9, particularly preferably from 0.02 to 0.2, can be set.

After the aqueous solution of alkali metal carbonate has been combined with the aqueous solution of transition metal salt(s), for example after the addition of the aqueous solution of alkali metal carbonate is complete, the combined aqueous phase has a pH in the range from 8.0 to 9.0.

In another embodiment, the aqueous solution of transition metal salt(s) can be combined with a solution comprising ammonia or ammonium salts.

In an embodiment of the present invention, the aqueous solution of alkali metal carbonate is combined with the aqueous solution of transition metal salt(s) in such an amount that the molar ratio of carbonate ions to M is in the range from 0.5 to 2, preferably from 0.7 to 1.3. When a comparatively high excess of M from the aqueous solution of transition metal salt(s) to carbonate from the aqueous solution of alkali metal carbonate is used, for example 1:0.5 or 1:0.7, preference is given to ammonia or ammonium carbonate or ammonium hydrogencarbonate being additionally added.

In an embodiment of the present invention, a reaction time in the range from 10 minutes to 100 hours, preferably from 10 hours to 60 hours, is selected for the precipitation. If step (A) is to be carried out continuously, it is possible to select, for example, an average residence time in the reaction vessel in the range from 10 minutes to 20 hours, preferably from 1 hour to 5 hours.

In an embodiment of the present invention mixing is carried out, for example, by means of pneumatic stirring or by means of stirring using a mechanical stirrer, for example a paddle stirrer, a grid stirrer, an anchor stirrer, an impeller stirrer, a blade stirrer or a disk stirrer, while combining the aqueous solution of alkali metal carbonate with the aqueous solution of transition metal salt(s).

In an embodiment of the present invention, an average mechanical power input in the range from 1 to 40 W/l, preferably from 5 to 30 W/l, can be effected, for example by stirring.

During the precipitation, a suspension having a particular solids content is formed. If step (A) is to be carried out continuously, it can be carried out at an average solids content in the range from 50 to 750 g/l.

The particles of material of the general formula (I) have a spherical shape. This means that the particles are essentially spherical.

Here, "essentially spherical" also encompasses, for example, particles which are not strictly spherical, for example ellipsoidal particles in which the semi-major axis and the semi-minor axis differ by not more than 10%. The morphology of material of the general formula (I) can be determined by microscopy, for example by optical microscopy (OMI) or by scanning electron microscopy (SEM).

The term "essentially spherical" also encompasses samples of particles which are not strictly spherical for which at least 95% (weight average) of the particles of a representative sample have an essentially spherical shape.

In an embodiment of the present invention, the particle diameter (D50) of material of the general formula (I) is in the range from 2 to 50 μm, preferably in the range from 2 to 25 μm, particularly preferably in the range from 4 to 20 μm. Here, the particle diameter (D50) is, for the purposes of the present invention, the average particle diameter (weight average) as can be determined, for example, by light scattering.

In an embodiment of the present invention, step (A) can be carried out at temperatures in the range from 0° C. to 100° C., preferably from 35° C. to 75° C.

Step (A) can be carried out at any pressure as long as the pressure is not lower than the vapor pressure of the aqueous solution. Suitable pressures are, for example, from 1 to 10 bar, with preference being given to atmospheric pressure.

Step (A) of the process of the invention can be carried out continuously or batchwise. If step (A) of the process of the invention is to be carried out continuously, step (A) can be carried out in a steady state or in a non-steady state, with preference being given to a steady state, also known as steady-state mode of operation.

Step (A) of the process of the invention can be carried out in air, under an inert gas atmosphere, for example under a noble gas or nitrogen atmosphere, or under a reducing atmosphere. Examples of reducing gases are, for example, CO and $SO_2$. Step (A) is preferably carried out under an inert gas atmosphere.

One variant of the process of the invention comprises the following steps:
(A') a material having the formula (I)

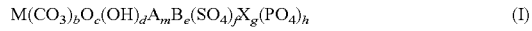

$$M(CO_3)_b O_c (OH)_d A_m B_e (SO_4)_f X_g (PO_4)_h \qquad (I)$$

where the variables are defined as follows:
M is one or more transition metals,
A is sodium or potassium,
B is one or more metals of groups 1 to 3 of the Periodic Table, excluding sodium and potassium,
X is halide, nitrate or carboxylate,
b is in the range from 0.75 to 0.98,
c is in the range from zero to 0.50,
d is in the range from zero to 0.50,
where the sum (c+d) is in the range from 0.02 to 0.50,
e is in the range from zero to 0.1,
f is in the range from zero to 0.05,
g is in the range from zero to 0.05,
h is in the range from zero to 0.10,
m is in the range from 0.002 to 0.1,
is precipitated from aqueous solution,
where the total concentration of transition metals M in the mother liquor is in the range from 50 ppm to 2000 ppm, preferably from 100 to 1000 ppm,
(B) the precipitated material is separated off from the mother liquor,
where the particles of material of the general formula (I) have a spherical shape.

The precipitation can preferably be carried out at a pH in the range from 7.5 to 10, preferably from 8.0 to 9.0.

The concentration of the transition metals M in the mother liquor is set by selecting a combination of residence time, molar ratio of carbonate ions and concentration of M. Here, the concentration of transition metals M in the mother liquor is the concentration of transition metal(s) M which are still present in solution in the solution ("mother liquor") as soon as the precipitated material is separated off.

The other aspects of the variant (A') correspond to step (A).

In step (B) of the process of the invention, the material of the formula (I) precipitated in step (A) or (A') is separated off from the mother liquor.

The term mother liquor refers to water, water-soluble salts and any further additives present in solution. Possible water-soluble salts are, for example, alkali metal salts of the counterions of transition metal M, for example sodium acetate, potassium acetate, sodium sulfate, potassium sulfate, sodium nitrate, potassium nitrate, sodium halide, in particular sodium chloride, potassium halide, also additional salts, any additives used and also possibly excess alkali metal carbonate.

When step (A) or (A') is carried out continuously, a representative proportion of each suspension formed can be taken from the reaction vessel, i.e., for example, in each case an aliquot, or a nonrepresentative proportion. Thus, for example, it is possible to take off mother liquor which has already separated out during removal from the reaction vessel. It is also possible for particles of material of the general formula (I) having particular particle sizes to be taken off preferentially even during removal from the reaction vessel.

Separation can be effected, for example, by filtration, centrifugation, decantation, spray drying or sedimentation or by a combination of two or more of the abovementioned operations. Suitable apparatuses are, for example, filter presses, belt filters, hydrocyclones, slant plate clarifiers or a combination of the abovementioned apparatus.

Step (B) can, particularly when the separation is carried out by filtration, be followed by one or more washing steps (C). Washing can, for example, be carried out using pure water or using an aqueous solution of alkali metal carbonate or alkali metal hydroxide, in particular an aqueous solution of sodium carbonate, potassium carbonate, sodium hydroxide, potassium hydroxide, lithium hydroxide or ammonia. Water is preferred.

Washing step(s) (C) can, for example, be carried out using superatmospheric pressure or elevated temperature, for example from 30 to 50° C. In another variant, washing step(s) (C) is/are carried out at room temperature.

The efficiency of the washing steps can be checked by means of analytic measures. Thus, for example, the content of transition metal(s) M in the washing water can be analyzed.

If washing is carried out using water rather than an aqueous solution of alkali metal carbonate, conductivity measurements can be carried out on the washing water to check whether water-soluble substances, for example water-soluble salts, can still be washed out.

Step (B) can be followed by one or more drying steps (D). Drying step(s) (D) can be carried out at room temperature or at elevated temperature. For example, drying can be carried out at temperatures in the range from 30 to 150° C.

Drying step(s) (D) can be carried out at atmospheric pressure or under reduced pressure, for example at a pressure in the range from 10 mbar to 500 mbar.

In an embodiment of the present invention, precursors prepared by the process of the invention still comprise physically bound water even after any drying step (D) or any drying steps (D).

In an embodiment of the present invention, step (B) is followed by one or more washing steps (C) and optionally one or more drying steps (D).

Water content and particle diameter of the precursor of transition metal mixed oxide are determined after step (B), preferably after step (D).

Precursors prepared by the process of the invention are very well suited to the production of cathodes for lithium ion batteries.

The present invention further provides materials of the general formula (I)

$$M(CO_3)_b O_c (OH)_d A_m B_e (SO_4)_f X_g (PO_4)_h \quad (I)$$

in particulate form, where the variables are defined as follows:
M is one or more transition metals, for example Ni, Mn, Co, Fe, Cu, Zn, Ti, Cr, preferably from two to four transition metals, particularly preferably three transition metals, in particular combinations of nickel, manganese and cobalt, A is potassium or preferably sodium,
B is one or more metals of groups 1 to 3 of the Periodic Table, with the exception of sodium and potassium, with preference being given to cesium, rubidium and particularly preferably lithium, magnesium, calcium and aluminum and also mixtures of two or more of the abovementioned elements,
X is halide, for example bromide, preferably chloride, particularly preferably fluoride, also nitrate or carboxylate, preferably $C_1$-$C_7$-carboxylate, in particular benzoate or acetate,
b is in the range from 0.75 to 0.98,
c is in the range from zero to 0.50, preferably up to 0.30,
d is in the range from zero to 0.50, preferably up to 0.30,
where the sum (c+d) is in the range from 0.02 to 0.50, preferably up to 0.30,
e is in the range from zero to 0.1, preferably up to 0.05,
f is in the range from zero to 0.05,
g is in the range from zero to 0.05,
h is in the range from zero to 0.1, preferably up to 0.05,
m is in the range from 0.002 to 0.1, preferably up to 0.05,
which can be water-comprising,
where the particles of material of the general formula (I) have a spherical shape. Material as characterized above will, for the purposes of the present invention, also be referred to as material of the invention.

The terms "water-comprising", "particle" and "spherical shape" have been explained above. The definitions are as above.

In an embodiment of the present invention, from 55 to 85 mol % of M is chosen as Mn, i.e. M is chosen so that from 55 to 85 mol % of M is manganese, and the balance is selected from one or more other transition metals, preferably from among Ni, Co, Fe, Cu, Zn, Ti and/or Cr and particularly preferably as a combination of Ni and Co.

In an embodiment of the present invention, the particle diameter (D50) of material of the invention is in the range from 2 to 50 μm, preferably in the range from 2 to 25 μm, particularly preferably in the range from 4 to 20 μm. Here, the particle diameter (D50) is, for the purposes of the present invention, the average particle diameter (weight average) as can be determined, for example, by light scattering.

Materials according to the invention can be readily processed to form transition metal mixed oxides which can be used for producing electrodes of lithium ion batteries. The present invention further provides for the use of materials according to the invention for preparing transition metal mixed oxides. The invention further provides a process for preparing transition metal mixed oxides using materials according to the invention.

The preparation of transition metal mixed oxides can be carried out by subjecting a mixture of at least one material according to the invention and at least one lithium compound to thermal treatment at temperatures in the range from 600 to 1000° C.

Suitable lithium compounds are, for example, metal-organic and preferably inorganic lithium compounds. Particularly preferred inorganic lithium compounds are selected from among LiOH, $Li_2CO_3$, $Li_2O$ and $LiNO_3$ and also corresponding hydrates, for example $LiOH \cdot H_2O$. Mixing can, for example, be carried out by mixing material according to the invention with a lithium compound in a solids mixer.

In an embodiment of the present invention, the stoichiometry of transition metal mixed oxide is set in the mixture of material according to the invention and lithium compound so that the molar ratio of lithium to the sum of transition metals is in the range from 0.9 to 1.6, preferably from 1.2 to 1.5. In another embodiment, the stoichiometry is set so that the molar ratio of lithium to the sum of transition metals is about 0.5, for example in the range from 0.4 to 0.6.

Transition metal mixed oxides prepared according to the invention can be processed very readily, for example because of their good powder flow, and display very good cycling stability when electrochemical cells are produced using transition metal mixed oxide prepared according to the invention.

Electrodes according to the invention can be produced by firstly processing transition metal mixed oxide to form electrode material.

Electrode material can also comprise carbon in an electrically conductive modification, for example as carbon black, graphite, graphene, carbon nanotubes or activated carbon, in addition to transition metal mixed oxide.

Electrode material can further comprise at least one binder, for example a polymeric binder.

Suitable binders are preferably selected from among organic (co)polymers. Suitable (co)polymers, i.e. homopolymers or copolymers, can, for example, be selected from among (co)polymers which can be obtained by anionic, catalytic or free-radical (co)polymerization, in particular from among polyethylene, polyacrylonitrile, polybutadiene, polystyrene, and copolymers of at least two comonomers selected from among ethylene, propylene, styrene, (meth)acrylonitrile and 1,3-butadiene. Polypropylene is also suitable. Furthermore, polyisoprene and polyacrylates are suitable. Particular preference is given to polyacrylonitrile.

For the purposes of the present invention, the term polyacrylonitrile refers not only to polyacrylonitrile homopolymers but also to copolymers of acrylonitrile with 1,3-butadiene or styrene. Preference is given to polyacrylonitrile homopolymers.

For the purposes of the present invention, polyethylene encompasses not only homopolyethylene but also copolymers of ethylene which comprise at least 50 mol % of ethylene in polymerized form and up to 50 mol % of at least one further comonomer, for example α-olefins such as propylene, butylene (1-butene), 1-hexene, 1-octene, 1-decene, 1-dodecene, 1-pentene, also isobutene, vinylaromatics such as styrene, also (meth)acrylic acid, vinyl acetate, vinyl propionate, $C_1$-$C_{10}$-alkyl esters of (meth)acrylic acid, in particular methyl acrylate, methyl methacrylate, ethyl acrylate, ethyl methacrylate, n-butyl acrylate, 2-ethylhexyl acrylate, n-butyl methacrylate, 2-ethylhexyl methacrylate, also maleic acid, maleic anhydride and itaconic anhydride. Polyethylene can be HDPE or LDPE.

For the purposes of the present invention, the term polypropylene encompasses not only homopolypropylene but also copolymers of propylene comprising at least 50 mol % of propylene in polymerized form and up to 50 mol % of at least one further comonomer, for example ethylene and α-olefins such as butylene, 1-hexene, 1-octene, 1-decene, 1-dodecene and 1-pentene. Polypropylene is preferably isotactic or essentially isotactic polypropylene.

For the purposes of the present invention, the term polystyrene encompasses not only homopolymers of styrene but also copolymers with acrylonitrile, 1,3-butadiene, (meth) acrylic acid, $C_1$-$C_{10}$-alkyl esters of (meth)acrylic acid, divinylbenzene, in particular 1,3-divinylbenzene, 1,2-diphenylethylene and α-methylstyrene.

Another preferred binder is polybutadiene.

Other suitable binders are selected from among polyethylene oxide (PEO), cellulose, carboxymethylcellulose, polyimides and polyvinyl alcohol.

In an embodiment of the present invention, binders are selected from among (co)polymers which have an average molecular weight $M_w$ in the range from 50 000 to 1 000 000 g/mol, preferably up to 500 000 g/mol.

Binders can be crosslinked or uncrosslinked (co)polymers.

In a particularly preferred embodiment of the present invention, binders are selected from among halogenated (co) polymers, in particular fluorinated (co)polymers. For the present purposes, halogenated or fluorinated (co)polymers are (co)polymers which comprise at least one (co)monomer having at least one halogen atom or at least one fluorine atom per molecule, preferably at least two halogen atoms or at least two fluorine atoms per molecule, in polymerized form.

Examples are polyvinyl chloride, polyvinylidene chloride, polytetrafluoroethylene, polyvinylidene fluoride (PVdF), tetrafluoroethylene-hexafluoropropylene copolymers, vinylidene fluoride-hexafluoropropylene copolymers (PVdF-HFP), vinylidene fluoride-tetrafluoroethylene copolymers, perfluoroalkyl vinyl ether copolymers, ethylene-tetrafluoroethylene copolymers, vinylidene fluoride-chlorotrifluoroethylene copolymers and ethylene-chlorofluoroethylene copolymers.

Suitable binders are, in particular, polyvinyl alcohol and halogenated (co)polymers, for example polyvinyl chloride or polyvinylidene chloride, in particular fluorinated (co)polymers such as polyvinyl fluoride and in particular polyvinylidene fluoride and polytetrafluoroethylene.

Electrically conductive, carbon-comprising material can, for example, be selected from among graphite, carbon black, carbon nanotubes, graphene and mixtures of at least two of the abovementioned materials. For the purposes of the present invention, electrically conductive, carbon-comprising material can also be referred to as carbon (B) for short.

In an embodiment of the present invention, the electrically conductive, carbon-comprising material is carbon black. Carbon black can, for example, be selected from among lamp black, furnace black, flame black, thermal black, acetylene black and industrial black. Carbon black can comprise impurities, for example hydrocarbons, in particular aromatic hydrocarbons, or oxygen-comprising compounds or oxygen-comprising groups such as OH groups. Furthermore, sulfur- or iron-comprising impurities are possible in carbon black.

In one variant, the electrically conductive, carbon-comprising material is partially oxidized carbon black.

In an embodiment of the present invention, the electrically conductive, carbon-comprising material is carbon nanotubes. Carbon nanotubes (CNTs), for example single-walled carbon nanotubes (SW CNTs) and preferably multi-walled carbon nanotubes (MW CNTs), are known per se. A process for producing them and some properties are described, for example, by A. Jess et al. in *Chemie Ingenieur Technik* 2006, 78, 94-100.

In an embodiment of the present invention, carbon nanotubes have a diameter in the range from 0.4 to 50 nm, preferably from 1 to 25 nm.

In an embodiment of the present invention, carbon nanotubes have a length in the range from 10 nm to 1 mm, preferably from 100 nm to 500 nm.

Carbon nanotubes can be produced by processes known per se. For example, a volatile carbon-comprising compound such as methane or carbon monoxide, acetylene or ethylene or a mixture of volatile carbon-comprising compounds such as synthesis gas can be decomposed in the presence of one or more reducing agents such as hydrogen and/or a further gas such as nitrogen. Another suitable gas mixture is a mixture of carbon monoxide with ethylene. Suitable temperatures for the decomposition are, for example, in the range from 400 to 1000° C., preferably from 500 to 800° C. Suitable pressure conditions for the decomposition are, for example, in the range from atmospheric pressure to 100 bar, preferably up to 10 bar.

Single-walled or multi-walled carbon nanotubes can be obtained, for example, by decomposition of carbon-comprising compounds in an electric arc, either in the presence or absence of a decomposition catalyst.

In one embodiment, the decomposition of a volatile carbon-comprising compound or volatile carbon-comprising compounds is carried out in the presence of a decomposition catalyst, for example Fe, Co or preferably Ni.

For the purposes of the present invention, the term graphene refers to virtually ideally or ideally two-dimensional hexagonal carbon crystals which have a structure analogous to individual graphite layers.

In an embodiment of the present invention, the weight ratio of transition metal mixed oxide which has been modified according to the invention to electrically conductive, carbon-comprising material is in the range from 200:1 to 5:1, preferably from 100:1 to 10:1.

A further aspect of the present invention provides an electrode comprising at least one transition metal mixed oxide which has been produced as described above, at least one electrically conductive, carbon-comprising material and at least one binder.

Transition metal mixed oxide and electrically conductive, carbon-comprising material have been described above.

The present invention further provides electrochemical cells produced using at least one electrode according to the invention. The present invention further provides electrochemical cells comprising at least one electrode according to the invention.

In an embodiment of the present invention, electrode material produced according to the invention comprises:
in the range from 60 to 98% by weight, preferably from 70 to 96% by weight, of transition metal mixed oxide,
in the range from 1 to 20% by weight, preferably from 2 to 15% by weight, of binder,
in the range from 1 to 25% by weight, preferably from 2 to 20% by weight, of electrically conductive, carbon-comprising material.

The geometry of electrodes according to the invention can be chosen within wide limits. Electrodes according to the invention are preferably in the form of thin films, for example films having a thickness in the range from 10 μm to 250 μm, preferably from 20 to 130 μm.

In an embodiment of the present invention, electrodes according to the invention comprise a film or foil, for example a metal foil, in particular an aluminum foil or a polymer film, for example a polyester film, which can be untreated or siliconized.

The present invention further provides for the use of electrode materials according to the invention or electrodes according to the invention in electrochemical cells. The present invention further provides a process for producing electrochemical cells using electrode material according to the invention or electrodes according to the invention. The present invention further provides electrochemical cells comprising at least one electrode material according to the invention or at least one electrode according to the invention.

In electrochemical cells according to the invention, electrodes according to the invention by definition serve as cathodes. Electrochemical cells according to the invention comprise a counterelectrode which, in the context of the present invention, is defined as anode and can be, for example, a carbon anode, in particular a graphite anode, a lithium anode, a silicon anode or a lithium titanate anode.

Electrochemical cells according to the invention can be, for example, batteries or accumulators.

Electrochemical cells according to the invention can comprise not only an anode and an electrode according to the invention but also further constituents, for example electrolyte salt, nonaqueous solvent, separator, power outlet leads, for example made of a metal or an alloy, also cable connections and housing.

In an embodiment of the present invention, electric cells according to the invention comprise at least one nonaqueous solvent which can be liquid or solid at room temperature and is preferably selected from among polymers, cyclic or acyclic ethers, cyclic and acyclic acetals and cyclic or acyclic organic carbonates.

Examples of suitable polymers are, in particular, polyalkylene glycols, preferably poly-$C_1$-$C_4$-alkylene glycols and in particular polyethylene glycols. Polyethylene glycols can here comprise up to 20 mol % of one or more $C_1$-$C_4$-alkylene glycols. Polyalkylene glycols are preferably polyalkylene glycols having two methyl or ethyl end caps.

The molecular weight $M_w$ of suitable polyalkylene glycols and in particular suitable polyethylene glycols can be at least 400 g/mol.

The molecular weight $M_w$ of suitable polyalkylene glycols and in particular suitable polyethylene glycols can be up to 5 000 000 g/mol, preferably up to 2 000 000 g/mol.

Examples of suitable acyclic ethers are, for example, diisopropyl ether, di-n-butyl ether, 1,2-dimethoxyethane, 1,2-diethoxyethane, with preference being given to 1,2-dimethoxyethane.

Examples of suitable cyclic ethers are tetrahydrofuran and 1,4-dioxane.

Examples of suitable acyclic acetals are, for example, dimethoxymethane, diethoxymethane, 1,1-dimethoxyethane and 1,1-diethoxyethane.

Examples of suitable cyclic acetals are 1,3-dioxane and in particular 1,3-dioxolane.

Examples of suitable acyclic organic carbonates are dimethyl carbonate, ethyl methyl carbonate and diethyl carbonate.

Examples of suitable cyclic organic carbonates are compounds of the general formulae (II) and (III)

where $R^1$, $R^2$ and $R^3$ can be identical or different and are selected from among hydrogen and $C_1$-$C_4$-alkyl, for example methyl, ethyl, n-propyl, isopropyl, n-butyl, isobutyl, sec-butyl and tert-butyl, with $R^7$ and $R^8$ preferably not both being tert-butyl.

In particularly preferred embodiments, $R^1$ is methyl and $R^2$ and $R^3$ are each hydrogen, or $R^1$, $R^2$ and $R^3$ are each hydrogen.

Another preferred cyclic organic carbonate is vinylene carbonate, formula (IV).

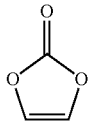

(IV)

The solvent or solvents is/are preferably used in the water-free state, i.e. with a water content in the range from 1 ppm to 0.1% by weight, which can be determined, for example, by Karl-Fischer titration.

Electrochemical cells according to the invention further comprise at least one electrolyte salt. Suitable electrolyte salts are, in particular, lithium salts. Examples of suitable lithium salts are $LiPF_6$, $LiBF_4$, $LiClO_4$, $LiAsF_6$, $LiCF_3SO_3$, $LiC(C_nF_{2n+1}SO_2)_3$, lithium imides such as $LiN(C_nF_{2n+1}SO_2)_2$, where n is an integer in the range from 1 to 20, $LiN(SO_2F)_2$, $Li_2SiF_6$, $LiSbF_6$, $LiAlCl_4$ and salts of the general formula $(C_nF_{2n+1}SO_2)_tYLi$, where t is defined as follows:

t=1, when Y is selected from among oxygen and sulfur,
t=2, when Y is selected from among nitrogen and phosphorus, and
t=3, when Y is selected from among carbon and silicon.

Preferred electrolyte salts are selected from among $LiC(CF_3SO_2)_3$, $LiN(CF_3SO_2)_2$, $LiPF_6$, $LiBF_4$, $LiClO_4$, with particular preference being given to $LiPF_6$ and $LiN(CF_3SO_2)_2$.

In an embodiment of the present invention, electrochemical cells according to the invention comprise one or more separators by means of which the electrodes are mechanically separated. Suitable separators are polymer films, in particular porous polymer films, which are unreactive toward metallic lithium. Particularly suitable materials for separators are polyolefins, in particular film-forming porous polyethylene and film-forming porous polypropylene.

Separators composed of polyolefin, in particular polyethylene or polypropylene, can have a porosity in the range from 35 to 45%. Suitable pore diameters are, for example, in the range from 30 to 500 nm.

In another embodiment of the present invention, separators can be selected from among PET nonwovens filled with inorganic particles. Such separators can have a porosity in the range from 40 to 55%. Suitable pore diameters are, for example, in the range from 80 to 750 nm.

Electrochemical cells according to the invention further comprise a housing which can have any shape, for example cuboidal or the shape of a cylindrical disk. In one variant, a metal foil configured as a pouch is used as housing.

Electrochemical cells according to the invention provide a high voltage and have a high energy density and good stability.

Electrochemical cells according to the invention can be combined with one another, for example can be connected in series or connected in parallel. Connection in series is preferred.

The present invention further provides for the use of electrochemical cells according to the invention in appliances, in particular in mobile appliances. Examples of mobile appliances are vehicles, for example automobiles, bicycles, aircraft or water vehicles such as boats or ships. Other examples of mobile appliances are those which move manually, for example computers, especially laptops, telephones or electric hand tools, for example in the building sector, especially drills, battery-powered screwdrivers or battery-powered tackers.

The use of electrochemical cells according to the invention in appliances offers the advantage of a longer running time before recharging. If an equal running time were to be achieved using electrochemical cells having a lower energy density, a greater weight of electrochemical cells would have to be accepted.

The invention is illustrated by examples.
Amounts of dissolved salts are based on kg of solution.
The proportion by mass of Ni, Co, Mn and Na was determined by inductively coupled plasma atomic emission spectroscopy (ICP-AES). The proportion by mass of $CO_3^{2-}$ was determined by treatment with phosphoric acid and measurement of the $CO_2$ evolved by IR spectroscopy. The proportion by mass of $SO_4^{2-}$ was determined by means of ion chromatography.

Only suspension which had been obtained after at least six times the residence time TR had elapsed was used for the work-up or for analytical purposes.

I. Precipitation of Materials of the Formula (I.1) to (I.11)
I.1 General Method for Trial 1
The following solutions were made up:
Solution (a.1): An aqueous solution of transition metal salts was produced by dissolving 0.363 mol/kg of nickel sulfate, 0.198 mol/kg of cobalt sulfate, 1.089 mol/kg of manganese (II) sulfate, 0.025 mol/kg of ammonium sulfate and 0.03 mol/kg of ammonium sulfite. The total transition metal concentration of solution (a.1) was 1.650 mol/kg. $\rho_{a.1}$=1.3 g/ml Solution (b.1): 1.60 mol/kg of sodium carbonate in water. $\rho_{b.1}$=1.2 g/ml 1.5 l of water was placed in a continuously operated precipitation apparatus under a stream of nitrogen (40 standard l/h) and, at 55° C. while stirring (1500 revolutions per minute), solution (a.1) at the constant pumping rate $PR_{a.1}$ and solution (b.1) at the constant pumping rate $PR_{b.1}$ were pumped in simultaneously. This resulted in precipitation of corresponding material of the formulae (I.1) to (I.11) and a suspension was formed in the precipitation apparatus.

Suspension was continuously taken up from the apparatus via an overflow in such an amount that an approximately constant volume of suspension was established in the precipitation apparatus during operation of the latter. In the case of the precipitation apparatus used, the volume V was 1.6 liters. The residence time TR could be calculated from V as $TR=V/(PR_{a.1}/\rho_{a.1}+PR_{b.1}/\rho_{b.1})$ where $\rho_{a.1}$ and $\rho_{b.1}$ are the densities of the solutions (a.1) and (b.1), respectively.

Further Work-Up of the Suspension
The suspension was filtered and the precipitated was separated off and washed with water. The precipitate was dried overnight at 105° C. in a drying oven and then sieved through a sieve having a mesh opening of 50 μm.

In trial 1, the concentration of ammonium sulfate and $PR_{a.1}$ and $PR_{b.1}$ was varied. As $PR_{b.1}$ increased, the pH increased and the metal concentration in solution decreased.

The concentrations of Ni, Co and Mn in the last three columns in each case relate to the filtrate.

TABLE 1.1

| | Concentrations in the filtrate (mother liquor) - Trial 1 | | | | | | |
|---|---|---|---|---|---|---|---|
| No. | c[(NH$_4$)$_2$SO$_4$] [mol/kg] | PR$_{a.1}$ [g/h] | PR$_{b.1}$ [g/h] | pH | c[Ni] [ppm] | c[Co] [ppm] | c[Mn] [ppm] |
| I.1 | 0.025 | 285 | 279 | 8.02 | — | — | — |
| I.2 | 0.025 | 285 | 294 | 8.35 | 225 | 30 | 110 |

TABLE 1.1-continued

Concentrations in the filtrate (mother liquor) - Trial 1

| No. | $c[(NH_4)_2SO_4]$ [mol/kg] | $PR_{a.1}$ [g/h] | $PR_{b.1}$ [g/h] | pH | c[Ni] [ppm] | c[Co] [ppm] | c[Mn] [ppm] |
|---|---|---|---|---|---|---|---|
| I.3 | 0.025 | 285 | 309 | 8.72 | 69 | <10 | <10 |
| I.4 | 0.025 | 285 | 323 | 8.95 | 38 | 16 | <10 |
| I.5 | 0.075 | 285 | 279 | 8.04 | 950 | 165 | 740 |
| I.6 | 0.075 | 285 | 294 | 8.31 | 430 | 43 | 115 |
| I.7 | 0.075 | 285 | 309 | 8.71 | 181 | 16 | 18 |
| I.8 | 0.075 | 285 | 323 | 8.91 | 148 | 21 | <10 |
| I.9 | 0.150 | 285 | 294 | 8.33 | 850 | 55 | 165 |
| I.10 | 0.150 | 285 | 309 | 8.72 | 440 | 28 | <10 |
| I.11 | 0.150 | 285 | 323 | 8.98 | 450 | 12 | 10 |

TABLE 1.2

Composition of precipitated materials of the formulae (I.1) to (I.11)

| No. | c[Ni] [% by weight] | c[Co] [% by weight] | c[Mn] [% by weight] | $c[CO_3^{2-}]$ [% by weight] | c[Na] [% by weight] | Molar ratio of $CO_3^{2-}$/(Ni + Co + Mn) |
|---|---|---|---|---|---|---|
| I.1 | 10.8 | 6.0 | 30.0 | 44.0 | 0.22 | 0.88 |
| I.2 | 10.9 | 6.0 | 30.4 | 44.5 | 0.30 | 0.88 |
| I.3 | 10.7 | 5.9 | 30.0 | 44.5 | 0.47 | 0.89 |
| I.4 | 10.9 | 6.0 | 30.5 | 46.5 | 0.55 | 0.92 |
| I.5 | 11.0 | 6.0 | 31.0 | 42.5 | 0.19 | 0.83 |
| I.6 | 10.8 | 5.9 | 30.0 | 43.0 | 0.26 | 0.86 |
| I.7 | 10.9 | 5.8 | 30.0 | 44.0 | 0.42 | 0.88 |
| I.8 | 10.8 | 5.9 | 30.0 | 44.5 | 0.55 | 0.89 |
| I.9 | 10.8 | 5.8 | 30.0 | 43.0 | 0.30 | 0.86 |
| I.10 | 10.6 | 5.6 | 29.2 | 45.5 | 0.45 | 0.94 |
| I.11 | 10.6 | 5.7 | 29.5 | 45.0 | 0.52 | 0.90 |

I.2 Method for Experiment I.12

The following solutions were made up:

Solution (a.2): An aqueous solution of transition metal salts was produced by dissolving 0.363 mol/kg of nickel sulfate, 0.198 mol/kg of cobalt sulfate and 1.089 mol/kg of manganese(II) sulfate. The total transition metal concentration of solution (a.2) was 1.650 mol/kg.
$\rho_{a.2}=1.3$ g/ml Solution (b.2): 1.30 mol/kg of sodium carbonate and 0.09 mol/kg of ammonium hydrogencarbonate in water. $\rho_{b.2}=1.15$ g/ml The procedure was essentially as described under I.1 but the solutions (a.2) and (b.2) were used. The pumping rates were $PR_{a.2}=235$ g/h and $PR_{b.2}=291$ g/h. Average residence time TR: 3.7 hours.

This Gave Precipitated Material (I.12).

TABLE 2

Composition of material (I.12)

| c[Ni] | c[Co] | c[Mn] | $c[SO_4^{2-}]$ | c[Na] | $c[CO_3^{2-}]$ | Molar ratio of $CO_3^{2-}$/(Ni + Co + Mn) |
|---|---|---|---|---|---|---|
| 10.8 | 5.5 | 31 | 0.08 | 0.38 | 42.0 | 0.83 |

Here, c is in each case the concentration in the material (I.12) and is reported in % by weight.

I.3 Method for Experiment I.13

The following solution was made up:

Solution (b.3): 1.30 mol/kg of sodium carbonate and 0.05 mol/kg of ammonium fluoride and 0.09 mol/kg of ammonium hydrogencarbonate in water. $\rho_{b.3}=1.15$ g/ml The procedure was essentially as described under I.1 but the solutions (a.2) (see above) and (b.3) were used. The pumping rates were $PR_{a.2}=235$ g/h and $PR_{b.3}=291$ g/h. Residence time TR: 3.7 h.

This Gave Precipitated Material (I.13).

TABLE 3

Composition of material (I.13):

| c[Ni] | c[Co] | c[Mn] | $c[SO_4^{2-}]$ | c[Na] | $c[CO_3^{2-}]$ | $c[F^-]$ | Molar ratio of $CO_3^{2-}$/(Ni + Co + Mn) |
|---|---|---|---|---|---|---|---|
| 10.4 | 5.9 | 30 | 0.10 | 0.33 | 41 | 0.24 | 0.83 |

Here, c is in each case the concentration of the ion concerned in the material (I.13) and is reported in % by weight.

I.4 Method for Experiment I.14

The following solutions were made up:

Solution (a.4): An aqueous solution of transition metal salts was produced by dissolving 0.396 mol/kg of nickel sulfate and 1.254 mol/kg of manganese(II) sulfate. The total transition metal concentration of solution (a.4) was 1.650 mol/kg.
$\rho_{a.4}=1.3$ g/ml The procedure was essentially as described under I.1 but the solutions (a.4) and (b.2) were used. The pumping rates were $PR_{a.4}=235$ g/h and $PR_{b.2}=286$ g/h. Average residence time TR: 3.7 hours.

This Gave Precipitated Material (I.14).

TABLE 4

Composition of material (I.14)

| c[Ni] | c[Mn] | $c[SO_4^{2-}]$ | c[Na] | $c[CO_3^{2-}]$ | Molar ratio of $CO_3^{2-}$/(Ni + Co + Mn) |
|---|---|---|---|---|---|
| 11.8 | 34 | 0.07 | 0.30 | 43.0 | 0.87 |

Here, c is in each case the concentration of the ion concerned in the material (I.14) and is reported in % by weight.

II. Preparation of Transition Metal Mixed Oxides

II.1 Preparation of Transition Metal Mixed Oxide TMO.14:

Material (I.14) was mixed with $Li_2CO_3$ (molar ratio of Li:Ni:Mn=0.5:0.25:0.75) and calcined at 900° C. in a muffle furnace for 12 hours. In this way, modified transition metal mixed oxide TMO.14 according to the invention having a spinel structure was obtained from the modified precursor.

II.2 Preparation of Transition Metal Mixed Oxide TMO.12

Material (I.12) was mixed with $Li_2CO_3$ (molar ratio of Li:Ni:Co:Mn=1.5:0.22:0.11:0.67) and calcined at 900° C. in a muffle furnace for 12 hours. In this way, modified transition metal mixed oxide TMO.12 according to the invention having a sheet structure was obtained.

III. General Method for Producing Electrodes and Test Cells

Materials Used:

Electrically conductive, carbon-comprising materials:

Carbon (C-1): Carbon black, BET surface area of 62 m²/g, commercially available as "Super P Li" from Timcal Binder (BM.1): Copolymer of vinylidene fluoride and hexafluoropropene, as powder, commercially available as Kynar Flex® 2801 from Arkema, Inc.

Figures in % are by weight, unless expressly indicated otherwise.

To determine the electrochemical data of the materials, 8 g of TMO.14 according to the invention, 1 g of carbon (C-1) and 1 g of (BM.1) were mixed with 24 g of N-methylpyrrolidone (NMP) to form a paste. A 30 μm thick aluminum foil was coated with the above-described paste (active material loading: 5-7 mg/cm²). After drying at 105° C., circular pieces of the aluminum foil which had been coated in this way (diameter: 20 mm) were stamped out. Electrochemical cells were produced from the electrodes which can be obtained in this way.

After drying at 105° C., circular electrodes (diameter: 20 mm) were stamped out and used to construct test cells. A 1 mol/l solution of $LiPF_6$ in ethylene carbonate/dimethyl carbonate (1:1 by mass) was used as electrolyte. The anode of the test cells comprised a lithium foil which was in contact with the cathode foil via a separator made of glass fiber paper.

This gave electrochemical cells EC.14 according to the invention.

The electrochemical cell EC.14 according to the invention was cycled (charged/discharged) 100 times between 4.9 V and 3.5 V at 25° C. The charging and discharging currents were in each case 150 mA/g of cathode material. The electrochemical cells EC.14 according to the invention had a discharge capacity of 135 mAh/g after 100 cycles.

The invention claimed is:

1. A process for preparing precursors for transition metal mixed oxides, wherein (A) precipitating a material having formula (I)

$$M(CO_3)_b O_c(OH)_d A_m B_e(SO_4)_f X_g(PO_4)_h \qquad (I)$$

where the variables are defined as follows:
M is one or more transition metals,
A is sodium or potassium,
B is one or more metals of groups 1 to 3 of the Periodic Table, excluding Na and potassium,
X is halide, nitrate or carboxylate,
b is from 0.75 to 0.98,
c is from zero to 0.50,
d is from zero to 0.50,
where the sum (c+d) is from 0.02 to 0.50,
e is from zero to 0.1,
f is from zero to 0.05,
g is from zero to 0.05,
h is from zero to 0.10,
m is from 0.002 to 0.1,
from aqueous solution at a pH in the range from 8.0 to 9.0 to yield precipitated material and a mother liquor; and
(B) separating the precipitated material off from the mother liquor,
where the particles of material of formula (I) have a spherical shape.

2. The process according to claim 1, wherein step (B) is followed by one or more washing steps (C) and optionally one or more drying steps (D).

3. The process according to claim 1, wherein X is fluoride.

4. The process according to claim 1, wherein M is chosen from at least two transition metals selected from among Ni, Mn, Co, Fe, Zn, Cr and Ti.

5. The process according to claim 1, wherein B is selected from among Li, Rb, Cs, Mg, Ca, Al and mixtures of two or more of the abovementioned elements of main groups 1 to 3 of the Periodic Table of the Elements.

6. The process according to claim 1, wherein the particle diameter (D50) is from 2 to 50 μm.

7. The process according to claim 1, wherein M is selected from among Ni, Co and Mn.

8. The process according to claim 1, wherein from 55 to 85 mol % of M is chosen as Mn.

9. The process according to claim 1, wherein the precipitation is effected by addition of an aqueous solution of sodium carbonate or potassium carbonate to an aqueous solution of acetates, sulfates or nitrates of transition metal(s) M.

10. A process for preparing precursors for transition metal mixed oxides, wherein (A') precipitating a material having formula (I)

$$M(CO_3)_b O_c(OH)_d A_m B_e(SO_4)_f X_g(PO_4)_h \qquad (I)$$

where the variables are defined as follows:
M is one or more transition metals,
A is sodium or potassium,
B is one or more metals of groups 1 to 3 of the Periodic Table, excluding Na and potassium,
X is halide, nitrate or carboxylate,
b is from 0.75 to 0.98,
c is from zero to 0.50,
d is from zero to 0.50,
where the sum (c+d) is from 0.02 to 0.50,
e is from zero to 0.1,
f is from zero to 0.05,
g is from zero to 0.05,
h is from zero to 0.10,
m is from 0.002 to 0.1,
from aqueous solution to yield precipitated material and a mother liquor,
where the total concentration of transition metals M in the mother liquor is from 50 ppm to 2000 ppm,
(B) separating the precipitated material off from the mother liquor,
where the particles of material of formula (I) have a spherical shape.

11. A material of formula (I)

$$M(CO_3)_b O_c(OH)_d A_m B_e(SO_4)_f X_g(PO_4)_h \qquad (I)$$

in particulate form, where the variables are defined as follows:
M is one or more transition metals,
A is sodium or potassium,
B is one or more metals of groups 1 to 3 of the Periodic Table, excluding Na and potassium,
X is halide, nitrate or carboxylate,
b is from 0.75 to 0.98,
c is from zero to 0.50,
d is from zero to 0.50,
where the sum (c+d) is from 0.02 to 0.50,
e is from zero to 0.1,
f is from zero to 0.05,
g is from zero to 0.05,
h is from zero to 0.10 and
m is from 0.002 to 0.1,
which can be water-comprising,
where the particles of material of formula (I) have a spherical shape.

12. The material according to claim 11, wherein M is chosen from at least two transition metals selected from among Ni, Mn, Co, Fe, Zn, Cr and Ti.

13. The material according to claim 11, wherein M is selected from among Ni, Co and Mn.

14. The material according to claim 11, wherein from 55 to 85 mol % of M is chosen as Mn.

15. The material according to claim 11, wherein its particle diameter (D50) is from 2 to 50 μm.

16. The material according to claim 11, wherein B is selected from among Li, Rb, Cs, Mg, Ca, Al and mixtures of two or more of the abovementioned elements of main groups 1 to 3 of the Periodic Table of the Elements.

17. A process for preparing transition metal mixed oxides, wherein a mixture of at least one material according to claim 11 and at least one lithium compound is treated thermally at temperatures from 600 to 1000° C.

18. A transition metal mixed oxide obtained by the process according to claim 17.

19. An electrode formulation obtained by mixing at least one transition metal mixed oxide according to claim 18 with carbon in an electrically conductive form and optionally with at least one polymeric binder.

20. An electrochemical cell produced using at least one electrode material according to claim 18.

21. An electrochemical cell produced using at least one electrode formulation according to claim 19.

* * * * *